(12) United States Patent
Okuda et al.

(10) Patent No.: US 9,707,830 B2
(45) Date of Patent: Jul. 18, 2017

(54) DIMMING CONTROL DEVICE

(71) Applicant: HONDA MOTOR CO., LTD., Minato-ku, Tokyo (JP)

(72) Inventors: Yuichiro Okuda, Swindon (GB); Takehiro Miyoshi, Utsunomiya (JP); Takashi Kondo, Sakura (JP); Masaki Kawamura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/107,611

(22) PCT Filed: Nov. 7, 2014

(86) PCT No.: PCT/JP2014/079572
§ 371 (c)(1),
(2) Date: Jun. 23, 2016

(87) PCT Pub. No.: WO2015/098312
PCT Pub. Date: Jul. 2, 2015

(65) Prior Publication Data
US 2016/0318379 A1 Nov. 3, 2016

(30) Foreign Application Priority Data

Dec. 27, 2013 (JP) ................................ 2013-272469

(51) Int. Cl.
*G02B 26/02* (2006.01)
*B60J 3/04* (2006.01)
*G02F 1/1333* (2006.01)

(52) U.S. Cl.
CPC ............ *B60J 3/04* (2013.01); *G02F 1/13338* (2013.01)

(58) Field of Classification Search
CPC ......... G02F 1/13338; B60J 3/04; G02B 26/02
USPC .................................................. 359/230, 614
See application file for complete search history.

(56) References Cited

U.S. PATENT DOCUMENTS 8,143,563 B2 * 3/2012 Broude ..................... B60J 3/04
250/203.4
2009/0015740 A1 1/2009 Sagitov et al.

FOREIGN PATENT DOCUMENTS

| CN | 102591513 A | 7/2012 |
| CN | 103150065 A | 6/2013 |
| JP | 2009-067191 A | 4/2009 |
| JP | 2009-241807 A | 10/2009 |
| JP | 2012-234331 A | 11/2012 |

(Continued)

OTHER PUBLICATIONS

PCT/ISA/210 from PCT/JP2014/079572.
(Continued)

*Primary Examiner* — Euncha Cherry
(74) *Attorney, Agent, or Firm* — Carrier Blackman & Associates, P.C.; Joseph P. Carrier; William D. Blackman

(57) ABSTRACT

A dimming control device includes a transmittance changing part provided on a windshield of a vehicle and configured to change light transmittance of the windshield; a detector configured to detect a position of a contact operation on the windshield by a user; and a dimming control part configured to change the transmittance according to the position of the contact operation on a detection surface of the detector on condition that the detector has detected a contact operation at a control start region which is preset within the detection surface.

11 Claims, 13 Drawing Sheets

(56) References Cited

FOREIGN PATENT DOCUMENTS

JP    5231846 B2    7/2013

OTHER PUBLICATIONS

Office Action issued in the corresponding Chinese Patent Application 201480070343.3 with English translation thereof, and a mailing date of May 4, 2017.

* cited by examiner

FIG. 4
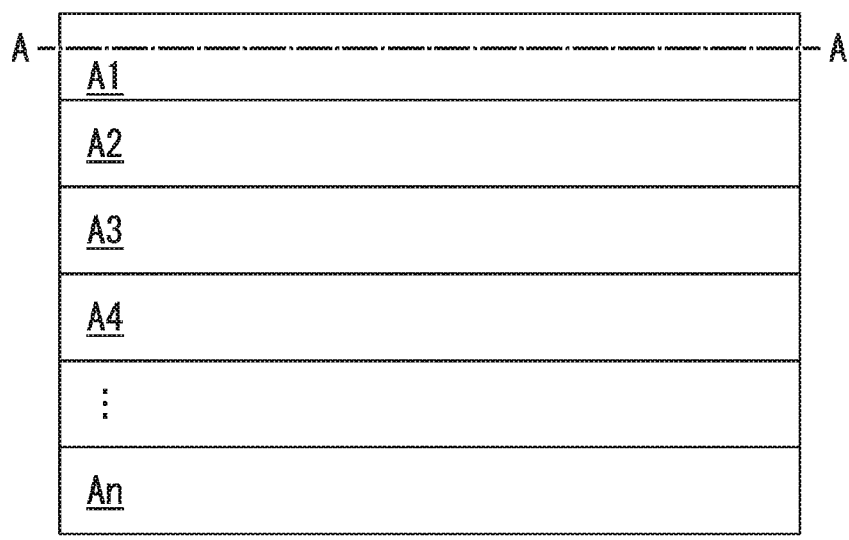
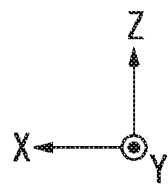
FIG. 5
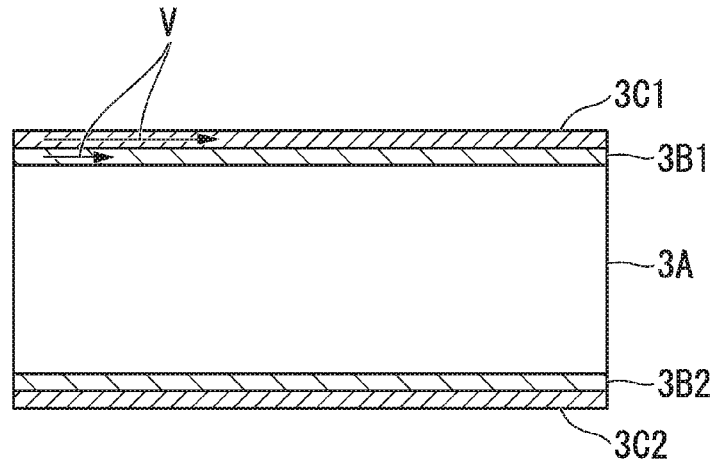
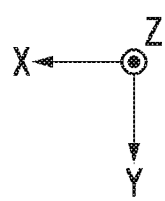

DIMMING CONTROL DEVICE

TECHNICAL FIELD

The present invention relates to a dimming control device.

Priority is claimed on Japanese Patent Application No. 2013-272469, filed Dec. 27, 2013, the content of which is incorporated herein by reference.

BACKGROUND ART

In recent years, technology for changing the transmittance of a windshield of a vehicle has been developed for the purpose of protecting privacy within the vehicle or preventing an in-vehicle temperature from increasing when the vehicle is stopped.

In relation to this, an in-vehicle dimming control device for decreasing the transmittance of the entire windshield when the vehicle reaches a predetermined place and then increasing the transmittance of a position in contact with a finger or the like by the user is disclosed (see Patent Document 1). Further, in this in-vehicle dimming control device, control of the transmittance is permitted while the vehicle is stopped and the control of the transmittance is prohibited when the vehicle travels.

PRIOR ART DOCUMENTS

Patent Document

Patent Document 1: Japanese Patent No. 5231846

SUMMARY OF INVENTION

Problems to be Solved by the Invention

However, in the conventional in-vehicle dimming control device, there is a problem for a stopping vehicle in that the transmittance of the contact position increases, for example, even when the user erroneously comes in contact with the windshield or wiping is performed to eliminate the fogging of the windshield, and dimming control unintended by the user is performed.

Therefore, an aspect of the present invention has been made in view of the above-described problem of the conventional technology, and provides a dimming control device capable of preventing dimming control unintended by a user from being performed.

Means for Solving the Problems (1) According to an aspect of the present invention, a dimming control device includes a transmittance changing part provided on a windshield of a vehicle and configured to change light transmittance of the windshield; a detector configured to detect a position of a contact operation on the windshield by a user; and a dimming control part configured to change the transmittance according to the position of the contact operation on a detection surface of the detector on condition that the detector has detected a contact operation at a control start region which is preset within the detection surface.

(2) In the aspect (1), the detector may include a first end portion of the transmittance changing part in a part of the detection surface; the control start region may be set at the first end portion of the transmittance changing part; and, when the user performs a slide operation from a first contact position, which is within the control start region, to a second contact position as the contact operation after the detector has detected the contact operation on the control start region, the dimming control part may set a region determined on the basis of the first end portion and the second contact position as a target region in which the transmittance is changed by the user.

(3) In the aspect (2), the control start region may be reset at a second end portion opposite to the first end portion as an end portion of the target region in the detection surface of the detector; and, when the user performs a slide operation from a third contact position, which is within the control start region, to a fourth contact position as the contact operation after the detector has detected the contact operation on the control start region, the dimming control part may set a region determined on the basis of the first end portion and the fourth contact position as the target region.

(4) In the aspect (2) or (3), the dimming control part may change the transmittance of the target region according to the slide operation by the user in a direction substantially orthogonal to a direction from a second end portion, which is opposite to the first end portion, to the first end portion.

(5) In the aspect (4), the dimming control part may change the transmittance of the target region when the user performs the slide operation in a substantially orthogonal direction within the target region.

(6) In the aspect (4), the detector may set the control start region at a third end portion which is opposite to the first end portion and which is an end portion in the detection surface, and the dimming control part may change the transmittance of the target region according to the slide operation by the user within the control start region in a direction substantially orthogonal to a direction from the third end portion to the first end portion.

(7) In any one of the aspects (1) to (6), the windshield may be at least one of a front windshield, a rear windshield, and a side windshield, and the control start region may be set at an upper end of the detector.

(8) According to another aspect of the present invention, a dimming control device includes a transmittance changing part provided on a windshield of a vehicle and configured to change light transmittance of the windshield; a detector set only in a region of a predetermined range along an end portion of a surface of the transmittance changing part and configured to detect a position of a contact operation on the windshield by a user; and a dimming control part configured to change the transmittance according to the position of the contact operation in a detection surface of the detector.

(9) According to another aspect of the present invention, a dimming control device includes a transmittance changing part provided on a windshield of a vehicle and configured to change light transmittance of the windshield; a detector provided in a region of a predetermined range of a surface in the transmittance changing part and configured to detect a position of a contact operation on the windshield by a user; and a dimming control part configured to change the transmittance according to the position of the contact operation in a detection surface of the detector, wherein the windshield is a side windshield, and wherein, when the windshield is open, the dimming control part does not change the transmittance.

(10) In the aspect (9), the detector may be provided in a region of a predetermined range which is at a lower side of the windshield and which is at a lower-end side of the transmittance changing part.

Advantageous Effects of Invention

According to the aspect (1), the dimming control device can change the transmittance according to the position of the contact operation on the detection surface of the detection unit on condition that the detection unit has detected the contact operation on the control start region which is preset in the detection surface. Thus, it is possible to prevent the dimming control unintended by the user from being performed.

According to the aspect (2), when the user performs the slide operation from the first contact position, which is within the control start region, to the second contact position as the contact operation after the detector has detected the contact operation on the control start region, the dimming control device sets the region determined on the basis of the first end portion and the second contact position as the target region in which the transmittance is changed by the user. Thus, it is possible to reduce the risk of contact with the control start region unintended by the user and provide a control start region that the user can easily find using the first end portion of the transmittance changing part as a mark. Further, the dimming control device can enlarge/reduce the target region as a roll sunshade and a slide sunshade. As a result, the user can cause the target region to appear according to an intuitive operation.

According to the aspect (3), the dimming control device resets the control start region at the lower end which is opposite to the upper end of the detector and which is the end portion of the antiglare region in the detection surface of the detector and sets the region determined on the basis of the first end portion and the fourth contact position as the target region when the user performs the slide operation from the third contact position within the control start region to the fourth contact position as the contact operation after the detector has detected the contact operation on the control start region preset in the detection surface of the detector. Thus, it is possible to more intuitively enlarge/reduce a region for the user to prevent the glare.

According to the aspect (4), (5), or (6), the dimming control device changes the transmittance of the target region according to the slide operation by the user in the direction substantially orthogonal to the direction from the second end portion, which is opposite to the first end portion, to the first end portion. Thus, it is possible to prevent an erroneous operation from occurring due to the slide operation by the user.

According to the aspect (7), the dimming control device is set in at least one of the front windshield, the rear windshield, and the side windshield, and sets the control start region at the upper end of the detector. Thus, the user can intuitively set the region for preventing the glare. This is because light entering the vehicle through a window opening portion (the front windshield, the rear windshield, or the side windshield) provided in a surface of the vehicle extending in an upward/downward direction generally enters from the upper-end side of the window opening, and therefore, the dimming control device can set a region for preventing a glare in an intuitive manner for the user by enlarging the antiglare region in a downward direction from its upper end in accordance with the slide operation.

According to the aspect (8), the dimming control device changes the light transmittance according to the position of the contact operation in the detection surface of the detector set only in the region of the predetermined range along the end portion of the surface of the transmittance changing part. Thus, it is possible to suppress the change in the light transmittance due to the erroneous operation in addition to obtaining similar effects to the aspect (1). Also, the dimming control device can allow the user to find the position of the detector on the basis of the transmittance changing part because the detector is set only in the region of the predetermined range along the end portion of the surface in the transmittance changing part.

According to the aspect (9), the dimming control device is provided in the side windshield, changes the transmittance according to the position of the contact operation on the detection surface on condition that the detector detects the contact operation on the control start region preset in the detection surface, and does not change the transmittance when the side windshield is open. Thus, it is possible to prevent a dimming unintended by the user (ineffective dimming) when it is impossible to prevent light from being incident from the vicinity of the upper-end portion of the window opening portion, for example, as in a state in which the side windshield is open and it is impossible to prevent glare even when dimming is performed in another region.

According to the aspect (10), in the dimming control device, the detector is provided in the region of the predetermined range which is at the lower side of the windshield and which is at the lower-end side of the transmittance changing part. Thus, when the user opens the window the detection surface of the detector is accommodated inside a door of the vehicle, and therefore the user becomes in a state which cannot contact the detection surface and the user cannot change the light transmittance. As a result, the dimming control device can reliably prevent the change in the light transmittance due to the erroneous operation in a situation in which the antiglare region is unnecessary as in the case in which the windshield is open.

BRIEF DESCRIPTION OF DRAWINGS

FIG. 4 is a diagram schematically showing a structure of the transmittance changing part to which an electrode divided into a plurality of regions is attached.

FIG. 5 is an example of a cross-sectional view in the direction A-A of a region A1 shown in FIG. 4.

DESCRIPTION OF EMBODIMENTS

First Embodiment

Figure 1:
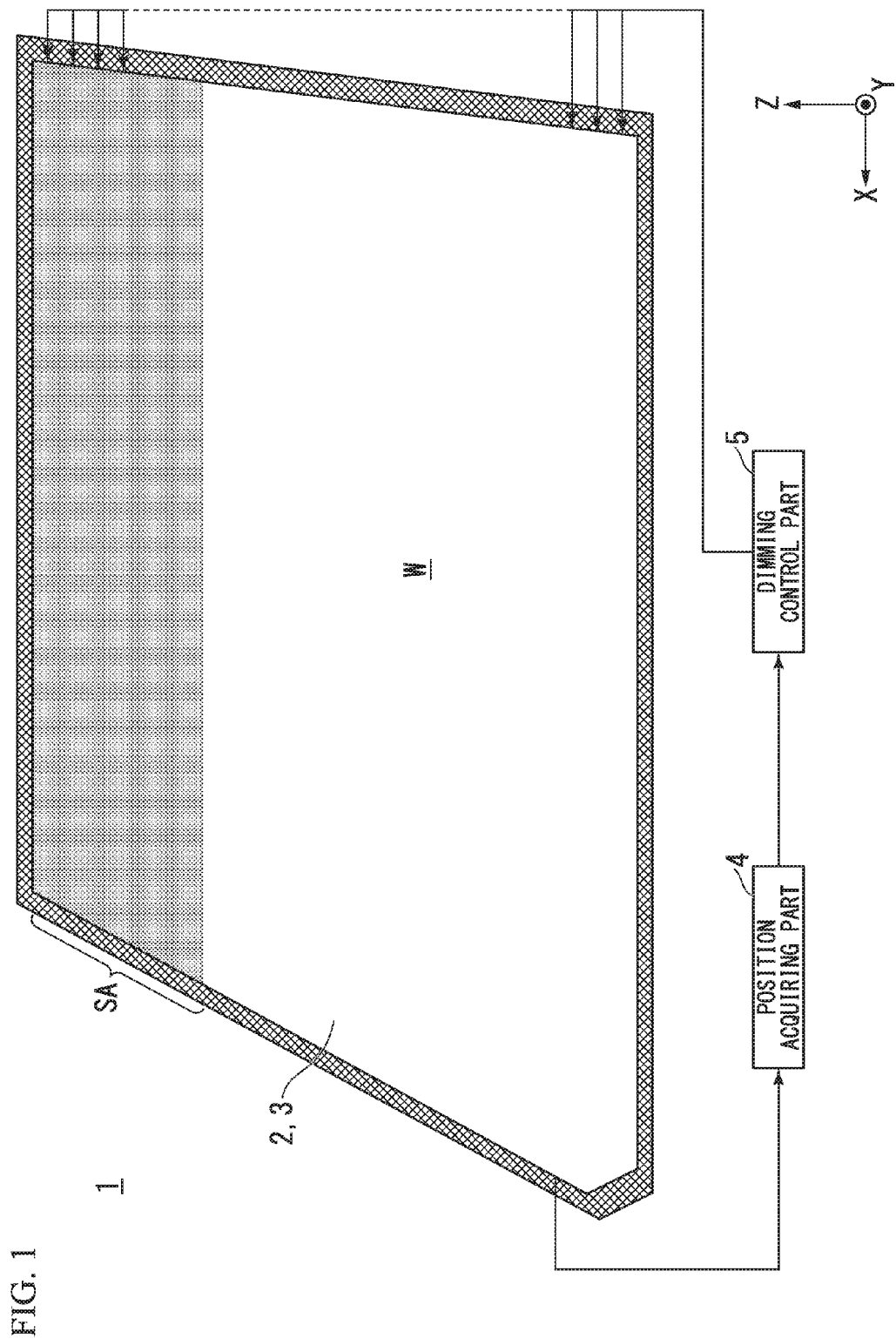
FIG. 1 is a diagram showing a configuration example of a dimming control device according to the present embodiment attached to a window portion of a four-wheeled vehicle.

Hereinafter, the first embodiment of the present application will be described with reference to the drawings. FIG. 1 is a diagram showing a configuration example of a dimming control device 1 according to the present embodiment attached to a window portion W of a four-wheeled vehicle.

The window portion W is, for example, a side windshield in which a window of a side of a vehicle is formed. The dimming control device 1 includes, for example, a contact position detector 2, a transmittance changing part 3, a position acquiring part 4, and a dimming control part 5. Hereinafter, a description will be given using an Orthogonal coordinate system in which a traveling direction of the four-wheeled vehicle equipped with the dimming control device 1 is designated as an X-direction, a vehicle width direction thereof is designated as a Y-direction, and a vertical direction thereof is designated as a Z-direction.

The dimming control device 1 detects a position of a contact operation (hereinafter referred to as a contact position) to be performed by the user on the window portion W and changes the light transmittance of the window portion W according to the detected contact position. Thus, the dimming control device 1 can protect privacy within the vehicle and further prevent an in-vehicle temperature from increasing while the vehicle is stopped, for example, by decreasing the light transmittance of the window portion W.

Also, the window portion W to which the dimming control device 1 is attached is not limited to the side windshield and may be attached to a rear windshield, a front windshield, a sunroof, or the like. Also, the dimming control device 1 may be attached to, for example, a windshield of a motorcycle or the like, instead of being attached to the window portion W of the four-wheeled vehicle.

A region SA of FIG. 1 is an antiglare region in which the light transmittance of the window portion W is changed to be low by the dimming control device 1. Here, the antiglare region is a region in which the light transmittance of the window portion W is decreased to prevent the user within the vehicle from being dazzled by light outside the vehicle. The antiglare region is an example of a target region.

The contact position detector 2 is, for example, a contact detection mechanism of a capacitive type, a resistive film type, or the like. The contact position detector 2 detects a position (contact position) of a contact operation performed by the user with a finger or the like from the inside of the passenger compartment for the window portion W and outputs information indicating its coordinates to the position acquiring part 4. The contact position detector 2 is provided to cover a part or all of the window portion W. The contact position detector 2 overlaps the transmittance changing part 3 or an intermediate film to be described below and is integrally formed as the window portion W.

The transmittance changing part 3 is a flat member in which the light transmittance changes according to an applied voltage. For example, liquid crystal, a suspended particle device (SPD), an electrochromic (EC) glass, or the like is used as the transmittance changing part 3. The transmittance changing part 3 is provided to cover a part or all of the window portion W. The transmittance changing part 3 is integrally formed as the window portion W to overlap the intermediate film or the like together with the contact position detector 2. In the first embodiment, the transmittance changing part 3 can change the transmittance for each of a plurality of band-like regions set to extend in a substantially horizontal direction in the window portion W.

The position acquiring part 4 acquires information indicating the contact position from the contact position detector 2 and outputs information indicating the acquired contact position to the dimming control part 5. The dimming control part 5 controls the transmittance changing part 3 on the basis of the information input from the position acquiring part 4. A plurality of arrows from the dimming control part 5 to the transmittance changing part 3 in FIG. 1 indicate voltage signals for electrodes provided in correspondence with the plurality of band-like regions of the transmittance changing part 3.

Figure 2:
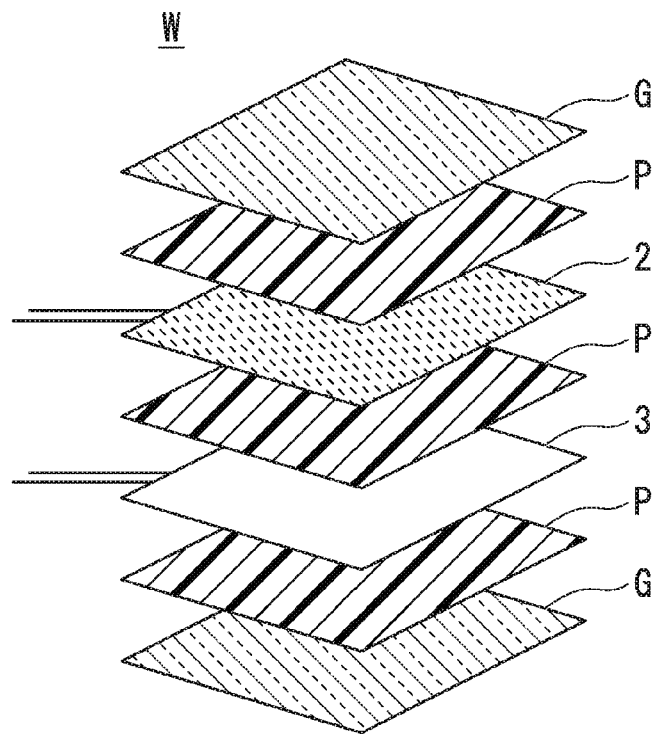
FIG. 2 is a diagram showing an example of a structure of a window portion in which a contact position detector and a transmittance changing part are integrally formed and overlap.

Next, the structure of the window portion W in which the contact position detector 2 and the transmittance changing part 3 are integrally formed and overlap will be described with reference to FIGS. 2 and 3. FIG. 2 is a diagram showing an example of a structure of the window portion W in which the contact position detector 2 and the transmittance changing part 3 are integrally formed and overlap. The window portion W has a laminated glass type of structure in which a glass G, an intermediate film P, the contact position detector 2, the intermediate film P, the transmittance changing part 3, the intermediate film P, and the glass G are integrally formed and overlap in this order, for example, as shown in FIG. 2. The intermediate film P is, for example, a transparent polyvinylbutyral (PVB) film or the like. The intermediate film P protects the contact position detector 2 and the transmittance changing part 3 in addition to preventing glass pieces from being scattered when the glass G is broken.

Figure 3:
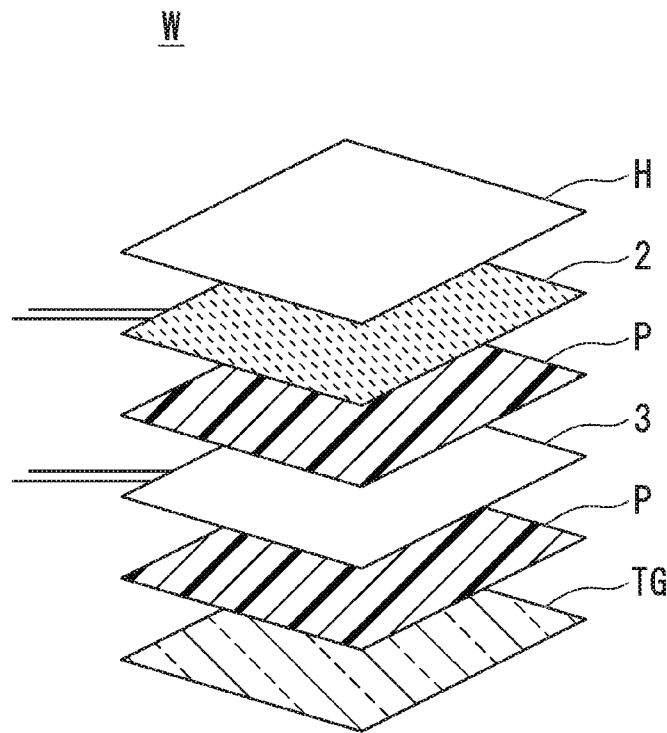
FIG. 3 is a diagram showing another example of a structure of a window portion in which a contact position detector and a transmittance changing part are integrally formed and overlap.

FIG. 3 is a diagram showing another example of a structure of the window portion W in which the contact position detector 2 and the transmittance changing part 3 are integrally formed and overlap. The structure of the window portion W shown in FIG. 3 is different from the laminated glass type shown in FIG. 2 and is a single glass (reinforced glass). The window portion W has a structure in which a hard coat film H, the contact position detector 2, an intermediate film P, the transmittance changing part 3, the intermediate film P, and a reinforced glass TG are integrally formed and overlap in this order, for example, as shown in FIG. 3. The hard coat film H is an optical film for limiting reflection, glare, or the like of external light.

Hereinafter, the structure of the transmittance changing part 3 will be described in further detail. FIG. 4 is a diagram schematically showing a structure of the transmittance changing part 3 to which electrodes corresponding to a plurality of regions are attached. In FIG. 4, the regions A1 to An are band-like regions in which the transmittance is individually changeable. In each band-like region, electrodes having light transmissivity formed by sputtering or the like are provided to be opposite to each other to surround a member in which the light transmissivity changes when a voltage is applied. The dimming control part 5 individually applies a voltage to each electrode via a bus bar (not shown).

FIG. 5 is an example of a cross-sectional view in the direction A-A of the region A1 shown in FIG. 4. In the transmittance changing part 3, electrodes 3B1 and 3B2 are provided to surround a light transmissivity variable member 3A. For example, indium tin oxide (ITO) or the like having conductivity and the high transmittance of visible light is used as the electrodes 3B1 and 3B2. In the structure shown in FIG. 4, the electrodes 3B1 and 3B2 become a structure in which both sides of the electrodes 3B1 and 3B2 are mutually separated for each region (that is, in relation to the Z-direction) or a structure in which the electrodes 3B1 or 3B2 are mutually separated for each region so that the voltage can be individually applied to each region.

Further, in the electrodes 3B1 and 3B2, for example, the mesh-like (lattice-like) prints of a conductive ink such as silver are provided as high-speed voltage application meshes 3C1 and 3C2, for example, in a surface of an opposite side facing the light transmissivity variable member 3A. A transfer speed V of a voltage in an X-direction in the high-speed voltage application mesh 3C1 or 3C2 is faster than that of the electrode 3B1 or 3B2. Thus, it is possible to prevent the unevenness of transmittance from being caused by the transfer delay of a voltage within each region by providing the high-speed voltage application meshes 3C1 and 3C2. Also, the high-speed voltage application meshes 3C1 and 3C2 may be printed in any conductive ink having higher conductivity than ITO in place of conductive ink of silver. Also, the transmittance changing part 3 may be a configuration obtained by omitting the high-speed voltage application meshes 3C1 and 3C2.

Similar to the electrodes 3B1 and 3B2, the high-speed voltage application meshes 3C1 and 3C2 also have a structure in which both sides of the high-speed voltage application meshes 3C1 and 3C2 are separated for each region or a structure in which the high-speed voltage application meshes 3C1 or 3C2 are mutually separated for each region so that the voltage can be individually applied to each region. Also, a structure in which only the high-speed voltage application meshes 3C1 are separated for each region is provided when only the electrodes 3B1 are mutually separated for each region, and a structure in which only the high-speed voltage application meshes 3C2 are separated for each region is provided when only the electrodes 3B2 are mutually separated for each region.

Figure 6A:
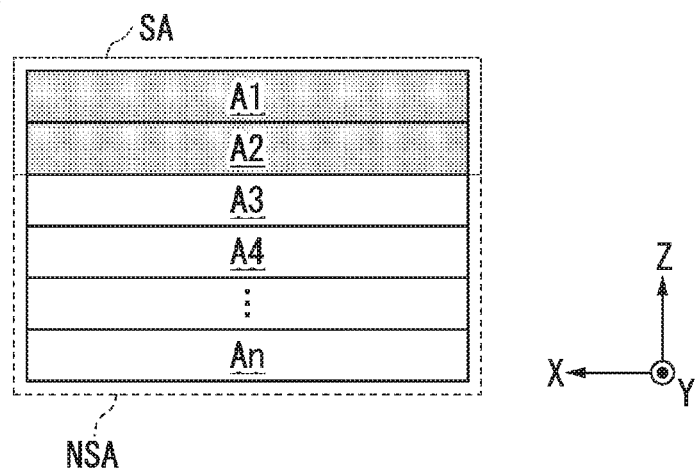
FIG. 6A shows a state in which a voltage is applied to regions A1 and A2 and the transmissivity is changed.
Figure 6B:
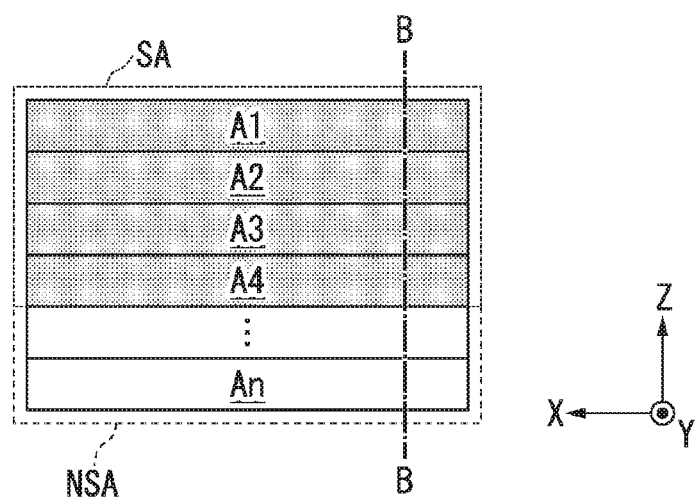
FIG. 6B shows a state in which a voltage is applied to regions A1 to A4 and the transmissivity is changed.
Figure 6C:
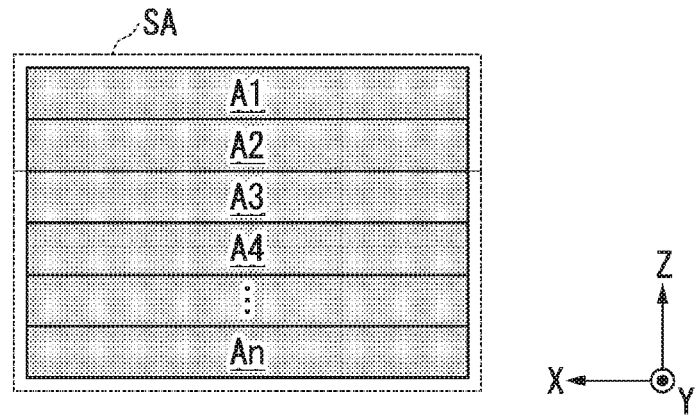
FIG. 6C shows a state in which a voltage is applied to regions A1 to An and the transmissivity is changed.

FIGS. 6A to 6C show a state in which a voltage is applied to some or all of regions A1 to An and the transmissivity is changed. FIG. 4 described above shows a state in which no voltage is applied to any region. In contrast, FIG. 6A shows a state in which the voltage is applied to the electrodes 3B1 and 3B2 of the regions A1 and A2 (and the high-speed voltage application meshes 3C1 and 3C2). Thereby, the light transmissivity variable member 3A of the regions A1 and A2 decreases the light transmissivity. As a result, the regions A1 and A2 form an antiglare region SA. Also, the remaining regions A3 to An form a non-antiglare region NSA having higher light transmissivity than the antiglare region SA.

Also, FIG. 6B shows a state in which a voltage is applied to the electrodes 3B1 and 3B2 of the regions A1 to A4 (and the high-speed voltage application meshes 3C1 and 3C2). Thereby, the light transmissivity variable member 3A of the regions A1 to A4 decreases the light transmissivity. As a result, the regions A1 to A4 form an antiglare region SA. Also, the remaining regions A5 to An form a non-antiglare region NSA having higher light transmissivity than the antiglare region SA.

Also, FIG. 6C shows a state in which a voltage is applied to the electrodes 3B1 and 3B2 of the regions A1 to An (and the high-speed voltage application meshes 3C1 and 3C2). Thereby, the light transmissivity variable member 3A of the regions A1 to An decreases the light transmissivity. As a result, the regions A1 to An form the antiglare region SA.

Figure 7:
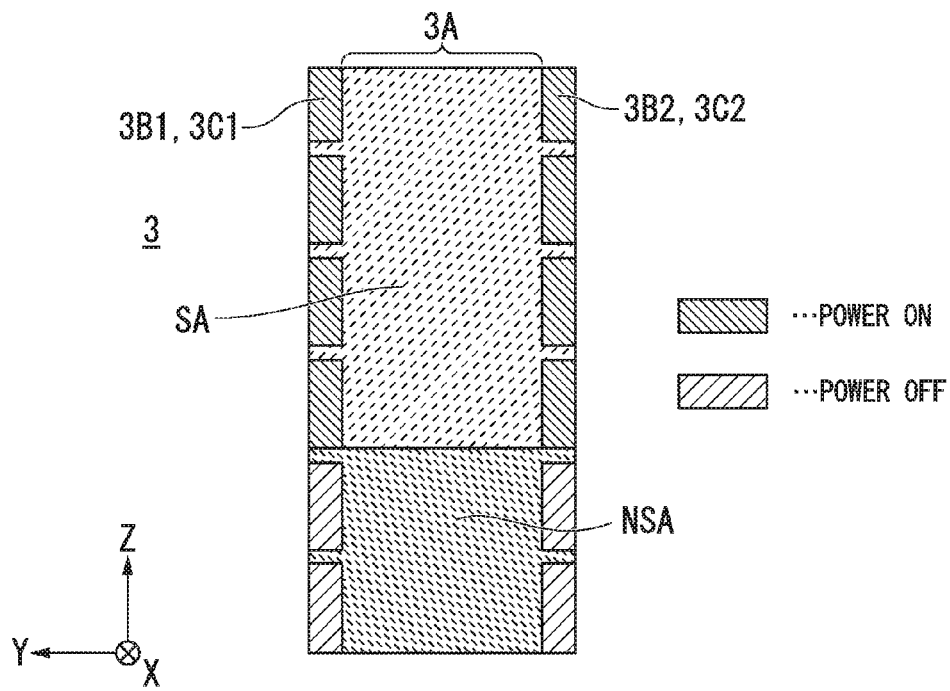
FIG. 7 is an example of a cross-sectional view in the direction B-B in FIG. 6B.

FIG. 7 is an example of a cross-sectional view in the direction B-B in FIG. 6B. FIG. 7 shows a cross-sectional view in which a structure in which both sides of electrodes 3B1 (and high-speed voltage application meshes 3C1) and electrodes 3B2 (and high-speed voltage application meshes 3C2) are separated for each region is adopted.

Figure 8:
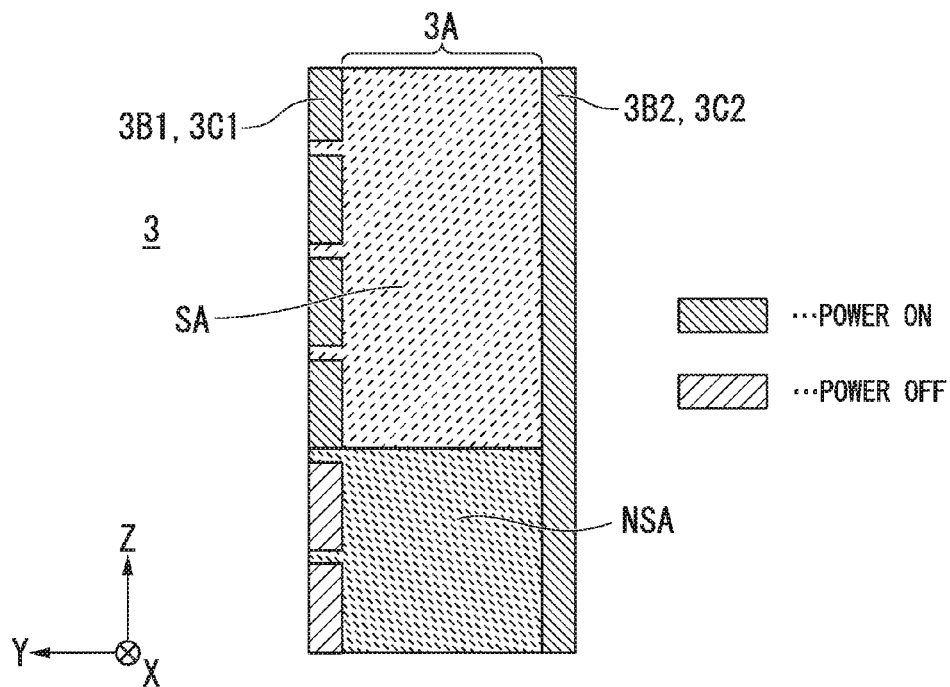
FIG. 8 is another example of a cross-sectional view in the direction B-B in FIG. 6B.

FIG. 8 is another example of a cross-sectional view in the direction B-B in FIG. 6B. FIG. 8 shows a cross-sectional view of the case in which only electrodes 3B1 (and high-speed voltage application meshes 3C1) are separated for each region and electrodes 3B2 (and high-speed voltage application meshes 3C2) are not separated for each region. Also, for manufacturing reasons or the like, a structure in which the intermediate film P is also separated for each region as in the electrode or the high-speed voltage application mesh may be provided.

When the user performs a slide operation on the detection surface of the contact position detector 2, the dimming control part 5 performs control of changing the transmittance of the transmittance changing part 3 on condition that a start position of the slide operation acquired by the position acquiring part 4 is within a control start region. The control start region is a region set in a range of a part or all of the detection surface of the contact position detector 2. Also, the dimming control part 5 determines a region for applying a voltage in the transmittance changing part 3 on the basis of an end position of the slide operation. In the first embodiment, the dimming control part 5 applies a voltage to the electrodes 3B1 and 3B2 (and the high-speed voltage application meshes 3C1 and 3C2; omitted hereinafter) of the corresponding region so that the antiglare region SA is provided by decreasing the transmittance of a region located on a straight line connecting the upper-end portion of the window portion W and the end position of the slide operation.

Figure 9:
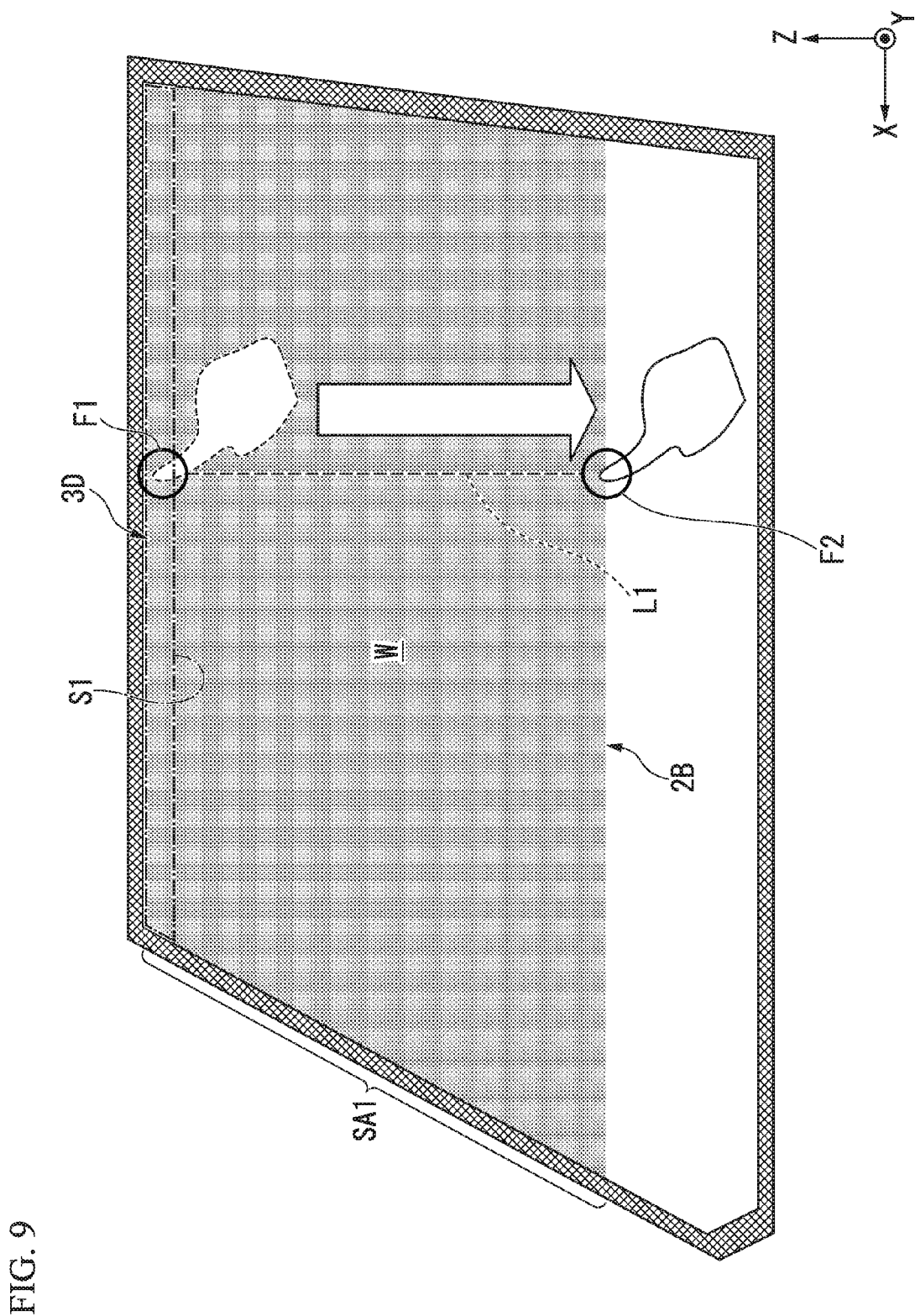
FIG. 9 is a diagram showing a state in which an antiglare region is set according to a slide operation of a user from a state in which no antiglare region is set.
Figure 10:
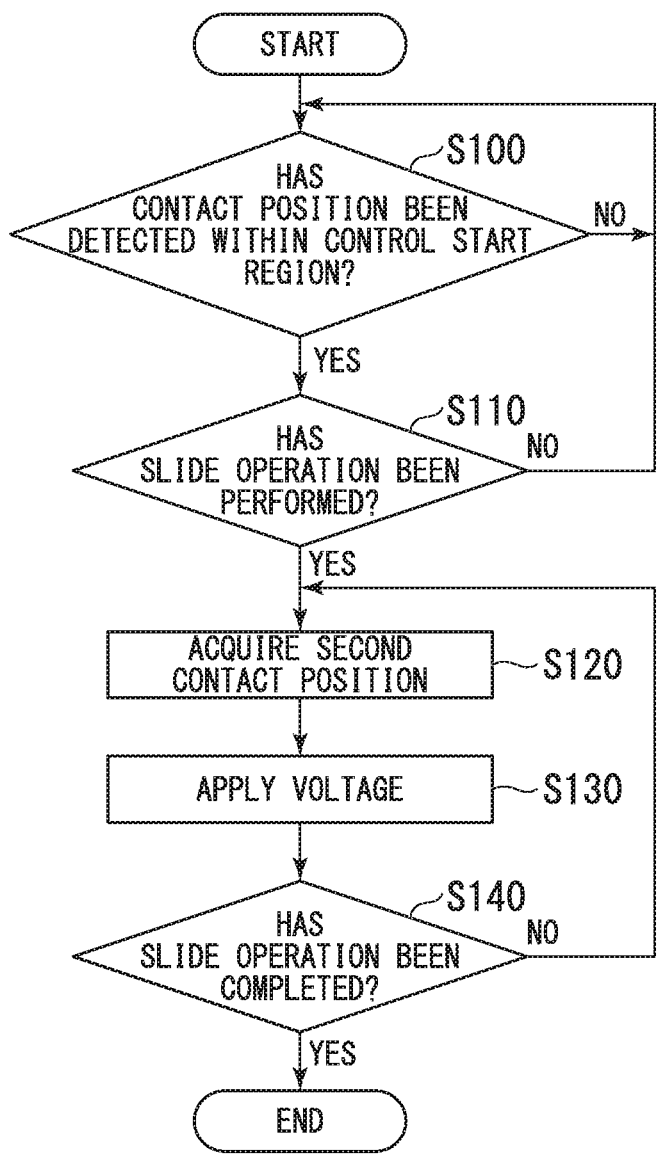
FIG. 10 is a flowchart showing an example of a flow of a process by the dimming control part in a scene shown in FIG. 9.

Next, the operation of the dimming control device 1 based on the slide operation of the user will be described with reference to FIGS. 9 to 11. FIG. 9 is a diagram showing a state in which the antiglare region SA is set according to the slide operation of the user from a state in which no antiglare region SA is set. A region S1 surrounded by a chain line of FIG. 9 is a control start region set in the detection surface of the contact position detector 2 positioned at an upper-end portion of the transmittance changing part 3 constituting the window portion W. The position of the control start region may be set at the upper-end portion of the window portion W. In this case, the upper-end portion of the contact position detector 2 may extend above the upper-end portion of the transmittance changing part 3. The upper-end portion of the contact position detector 2 is an example of a first end portion.

Also, although the contact position detector 2 is provided to cover the whole of the window portion W or the transmittance changing part 3 in the present embodiment, the contact position detector 2 may be provided to include the upper-end portion of the transmittance changing part 3 in a part of the detection surface in place of this. In this case, the dimming control device 1 can cause the antiglare region to appear in the window portion W according to a process similar to that described in the first embodiment.

As shown in FIG. 9, the dimming control part 5 applies the voltage to the electrodes 3B1 and 3B2 of the corresponding region so that the voltage is applied to a region located on a straight line L1 connected from the upper-end portion 3D of the transmittance changing part 3 to a second contact position F2 when the user touches a first contact position F1 within the control start region S1 and performs a slide operation to the second contact position F2 in a state in which the antiglare region SA is not shown. Thus, as shown in FIG. 9, the antiglare region SA1 is set to be a region from the upper-end portion (≈3D) of the window portion W to a position at which the user ends the slide operation.

Thereby, the user who uses the dimming control device 1 of the present embodiment can cause the antiglare region SA1 to appear according to an operation as if a roll sunshade were being brought down, that is, an intuitive operation. Also, the width of the control start region is set to, for example, about 3 cm.

Also, instead of this, the dimming control device 1 may apply the voltage to the transmittance changing part 3 so that the voltage is applied to a region located on a straight line connected from the upper-end portion 3D of the transmittance changing part 3 to any position calculated on the basis of the second contact position F2. Also, the dimming control device 1 may apply the voltage to the transmittance changing part 3 so that the voltage is applied to the region located on a straight line connected from a lower-end portion, a left-end portion, a right-end portion of the transmittance changing part 3, or a predetermined position to any position calculated on the basis of the second contact position F2.

Next, a flow of a process by the dimming control part 5 in the scene shown in FIG. 9 will be described with reference to FIG. 10. FIG. 10 is a flowchart showing an example of a flow of a process by the dimming control part 5 in a scene shown in FIG. 9. The process of this flowchart starts in a state in which no antiglare region SA is set. First, the dimming control part 5 waits until the contact position is detected in the control start region (step S100). When the contact position is detected in the control start region, it is determined whether the slide operation has been performed (step S110). When no slide operation has been performed, the process returns to step S100 again and waits until the contact position is detected in the control start region.

When the slide operation is performed, the dimming control part 5 acquires a second contact position, that is, a position of a contact operation at that time point (step S120). The dimming control part 5 applies the voltage to all regions present on a straight line connecting the upper-end portion 3D of the transmittance changing part 3 and the acquired second contact position (step S130). Next, the dimming control part 5 determines whether the slide operation by the user has been completed (step S140). When it is determined that the slide operation has not been completed, the dimming control part 5 returns to step S120 and re-acquires the second contact position. On the other hand, the dimming control part 5 ends the process of the flowchart of FIG. 10 when it is determined that the slide operation has been completed.

Figure 11:
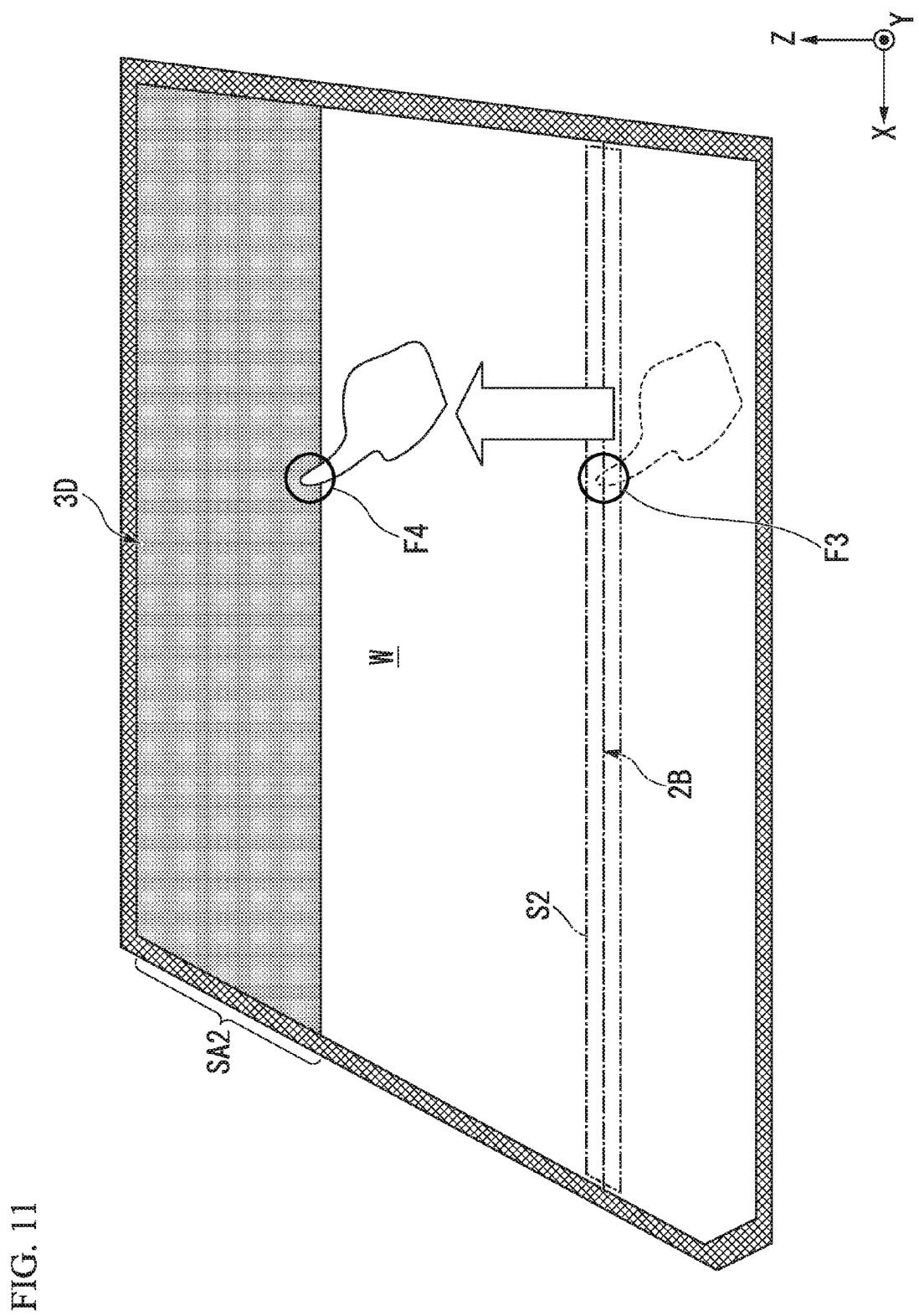
FIG. 11 is a diagram showing a state in which the antiglare region is reset according to the slide operation of the user from a state in which the antiglare region is set.

FIG. 11 is a diagram showing a state in which an antiglare region SA2 is reset according to the slide operation of the user from a state in which the antiglare region SA1 is set. When the user separates his/her finger from the contact position detector 2 in the state shown in FIG. 9, the dimming control part 5 resets the control start region S2 on the basis of an end portion (2B in FIG. 9) opposite to the upper-end portion 3D in which the control start region is set in the antiglare region SA1. For example, the end portion 2B opposite to the upper-end portion 3D of the transmittance changing part 3 is an example of a second end portion. A region S2 shown in FIG. 11 indicates a reset control start region. The dimming control part 5 sets the control start region S2, for example, as a band-like position obtained by displacement from the end portion 2B extending in the X-direction with a predetermined width in a +Z-direction and a −Z-direction. Also, instead of this, the dimming control part 5 may set the control start region S2 according to another technique based on the end portion 2B. When the user touches a position of a third contact position F3 within the region S2 and continuously performs the slide operation to a position of a fourth contact position F4 in a touching state, the dimming control part 5 resets the antiglare region, for example, on the basis of the upper-end portion 3D of the transmittance changing part 3 and the fourth contact position F4 (shown as the antiglare region SA2 in FIG. 11).

Figure 12:
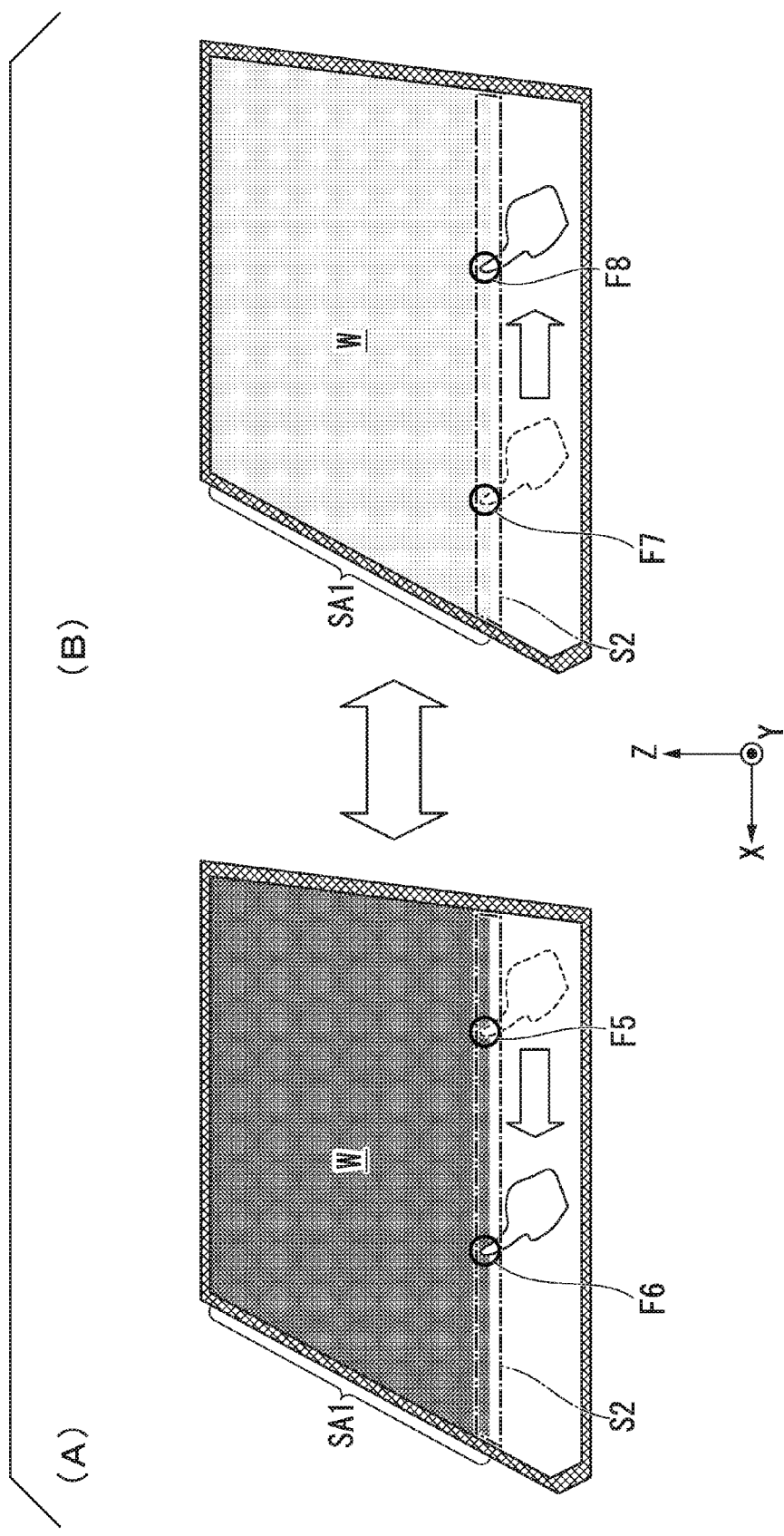
FIG. 12 is a diagram showing a state in which light transmittance of the antiglare region is changed according to the slide operation of the user from a state in which the antiglare region is set.

Next, the operation of the dimming control device 1 based on the slide operation of the user in the X-direction within the control start region will be described with reference to FIG. 12. FIG. 12 is a diagram showing a state in which the light transmittance of the antiglare region SA1 is changed according to the slide operation of the user on the control start region S2 from a state in which the antiglare region SA1 is set. The dimming control part 5 changes the transmittance of the antiglare region SA1 according to the slide operation by the user in a direction (X-direction) substantially orthogonal to a direction from the lower-end portion opposite to the upper-end portion 3D of the transmittance changing part 3 within the control start region S2 to the upper-end portion 3D. Also, the dimming control part 5 may change the transmittance of the antiglare region SA1 according to the slide operation by the user in a direction substantially orthogonal to a direction from the lower-end portion opposite to the upper-end portion 3D of the transmittance changing part 3 in a region outside the control start region S2 or across the inside and outside of the control start region S2 to the upper-end portion 3D.

More specifically, when the user touches a fifth contact position F5 in the control start region S2 as shown in FIG. 12(A) from the state shown in FIG. 9 and performs the slide operation to a sixth contact position F6 in the control start region S2 (the slide operation in a positive direction of the X-direction), the dimming control part 5 increases the voltage to be applied to the antiglare region SA1. Thus, the light transmittance of the antiglare region SA1 is set to be lower than the light transmittance of the antiglare region SA1 shown in FIG. 9. In contrast, the dimming control part 5 may decrease the light transmittance of the antiglare region SA1 according to the slide operation in a negative direction of the X-direction.

On the other hand, when the user touches a seventh contact position F7 in the control start region S2 as shown in FIG. 12(B) from the state shown in FIG. 9 and performs the slide operation (the slide operation in a negative direction of the X-direction) to an eighth contact position F8 in the control start region S2, the dimming control part 5 decreases the voltage to be applied to the antiglare region SA1. Thus, the light transmittance of the antiglare region SA1 is set to be higher than the light transmittance of the antiglare region SA1 shown in FIG. 9. Also, the dimming control part 5 may improve the light transmittance of the antiglare region SA1 according to the slide operation in the positive position of the X-direction.

Also, after the entire window portion W is set to the antiglare region according to any operation by the user, the dimming control part 5 may perform the above-described operation so that a part of the antiglare region is set to a region having high light transmissivity. Any operation by the user is, for example, an operation of touching the control start region one or more times or the like.

As described above, the dimming control device 1 according to the first embodiment changes the transmittance of the transmittance changing part 3 on the basis of a contact position by the user on condition that the contact operation on a preset control start region is detected in the detection surface of the contact position detector 2. Thus, it is possible to prevent dimming control unintended by the user from being performed.

Also, in the dimming control device 1, the upper-end portion of the transmittance changing part 3 is included as a part of the detection surface of the contact position detector 2 and the control start region is set in the upper-end portion of the transmittance changing part 3. Thus, it is possible to reduce a risk of contact with the control start region unintended by the user. Further, because the control start region is set as described above, the dimming control device 1 can provide the control start region capable of being easily found by the user using the upper-end portion of the transmittance changing part 3 as a mark.

Also, the dimming control device 1 sets a region determined on the basis of the first end portion and the second contact position as the antiglare region in which the transmittance is changed by the contact operation of the user when the user performs the slide operation from the first contact position, which is within the control start region, to the second contact position as the contact operation after the contact position detector has detected the contact operation at the control start region preset in the detection surface of the contact position detector 2. Thus, it is possible to enlarge/reduce the antiglare region as a roll sunshade or a slide sunshade. As a result, the user can cause the antiglare region to appear according to an intuitive operation.

Also, the dimming control device 1 resets the control start region at an end portion of the antiglare region which is already formed in the detection surface of the contact position detector 2 and sets the region determined on the basis of the first end portion and the fourth contact position as the antiglare region when the user performs the slide operation from the third contact position, which is within the control start region, to the fourth contact position as the contact operation after the contact position detector 2 has detected the contact operation at the reset control start region. Thus, it is possible to more intuitively enlarge/reduce a region for the user to prevent the glare.

Also, the dimming control device 1 changes the light transmittance of the antiglare region according to the slide operation of the contact position by the user in the direction substantially orthogonal to a direction from the lower-end portion opposite to the upper-end portion of the contact position detector 2 to the upper-end portion. Thus, it is possible to prevent an erroneous operation due to the slide operation by the user.

Second Embodiment

Hereinafter, the second embodiment of the present invention will be described with reference to the drawings. In a dimming control device 1 according to the second embodiment, a contact position detector 2 is not provided to cover the entire surface of a window portion W, but is provided to cover a part of the window portion W. In other configurations, for example, a structure or the like of a transmittance changing part 3 is cited, and the same functional units are assigned the same reference signs and a description thereof will be omitted.

Figure 13:
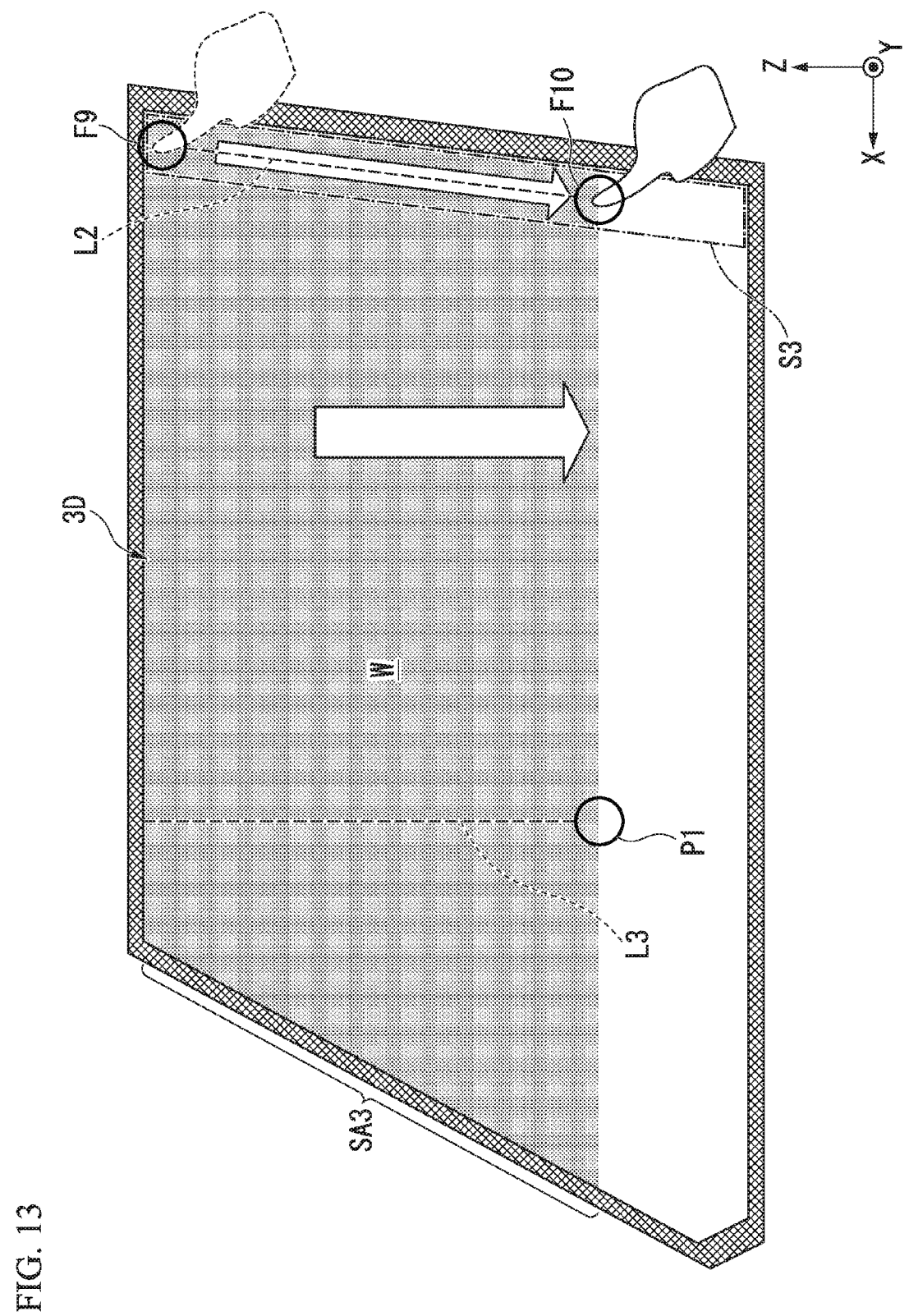
FIG. 13 is a diagram showing a state in which the antiglare region is set according to the slide operation of the user on a contact position detector, which is provided to cover a part of the window portion, from a state in which no antiglare region is set.

Here, an operation of the dimming control device 1 based on the slide operation of the user to the contact position detector 2 provided in a region of a predetermined range of a surface in the transmittance changing part will be described with reference to FIG. 13. A dimming control part 5 changes the light transmittance of the transmittance changing part 3 according to the slide operation of the user in the detection surface of the contact position detector 2 provided in a region of a predetermined range in a surface in the transmittance changing part 3. FIG. 13 is a diagram showing a state in which an antiglare region SA3 is set according to the slide operation of the user on the contact position detector 2 provided to cover a part of the window portion W from a state in which no antiglare region is set. A region S3 surrounded by a chain line of FIG. 13 is a region in which the contact position detector 2 provided in the window portion W is located.

As shown in FIG. 13, when the user touches a ninth contact position F9 within the region S3 in which the contact position detector 2 is provided in a state in which no antiglare region appears and performs the slide operation to a tenth contact position F10, the dimming control part 5 calculates a length of a straight line L2 connected from the ninth contact position F9 to the tenth contact position F10 and applies the voltage to the electrodes 3B1 and 3B2 of a corresponding region so that the voltage is applied to a region located on a straight line L3 connected from an upper-end portion 3D of the transmittance changing part 3 to a position P1 according to a length calculated in a negative direction of the Z direction. Thus, as shown in FIG. 13, the antiglare region SA3 is set to be a region from the upper-end portion ($\approx$3D) of the window portion W to the position P1 according to a length calculated on the basis of the slide operation of the user. Also, the calculated length is an example of information related to the position. Also, the dimming control part 5 may perform predetermined calculation on the basis of the calculated length and select an electrode to which the voltage is applied on the basis of a calculation result.

Figure 14:
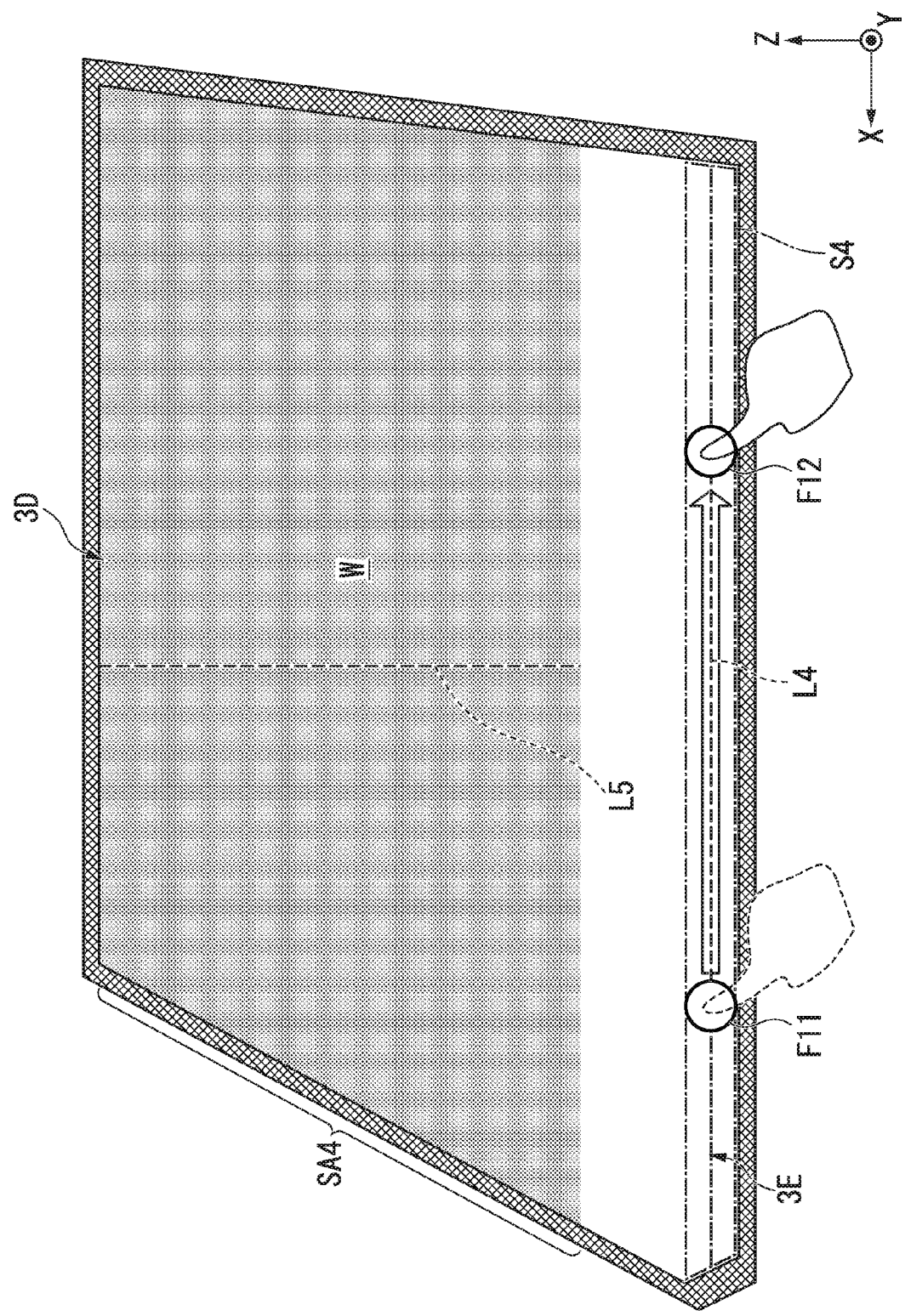
FIG. 14 is a diagram showing a state in which the antiglare region is set according to the slide operation of the user on the contact position detector when the contact position detector is provided in a lower-end portion of the window portion.
Figure 15:
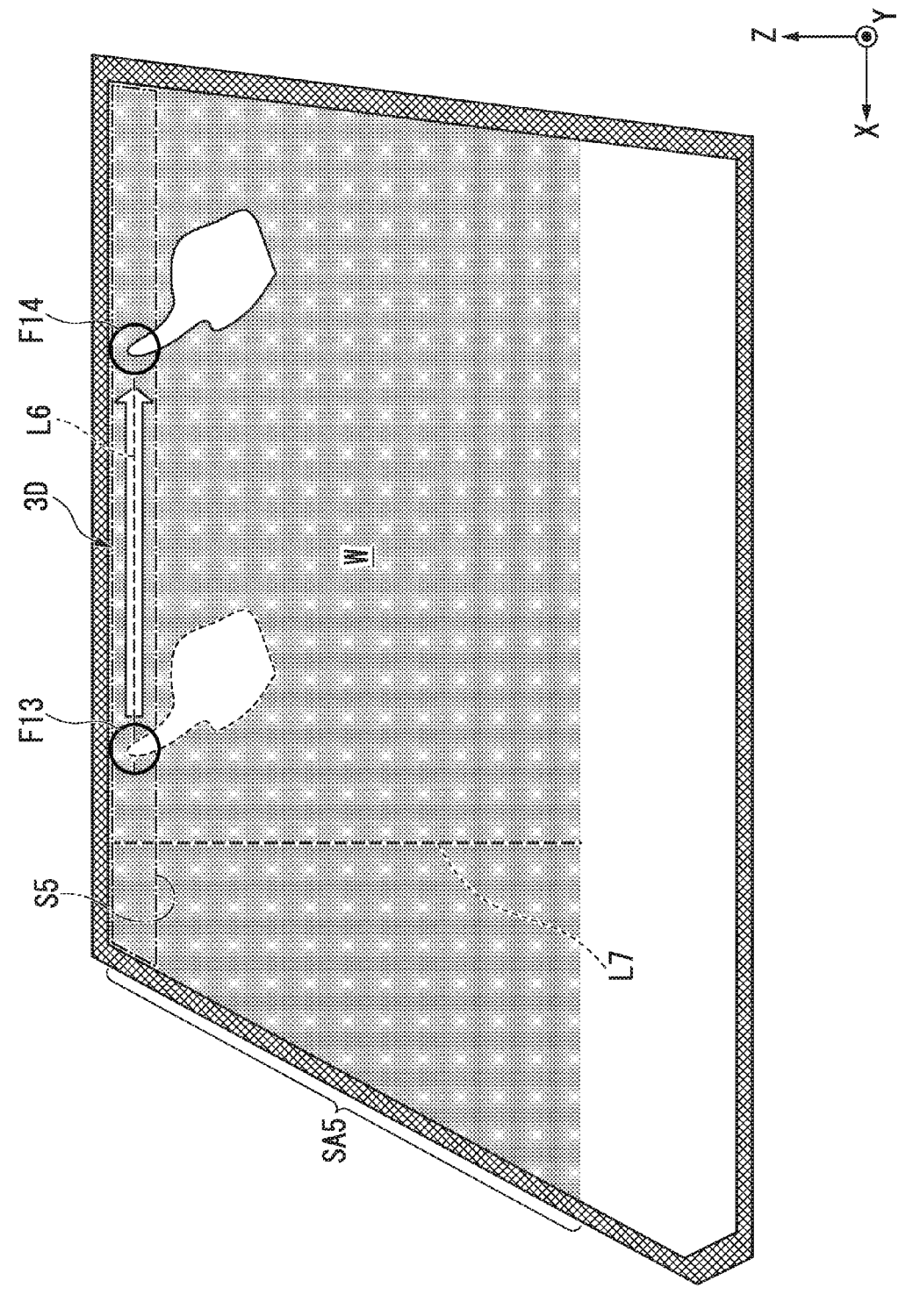
FIG. 15 is a diagram showing a state in which the antiglare region is set according to the slide operation of the user on the contact position detector when the contact position detector is provided in a lower-end portion of the window portion.

Also, the contact position detector 2 may be provided in a left-end portion of the window portion W instead of a right-end portion of the window portion W or provided in a lower-end portion of the window portion W as shown in FIG. 14 or an upper-end portion of the window portion W as shown in FIG. 15.

FIG. 14 is a diagram showing a state in which an antiglare region SA4 is set according to the slide operation of the user on the contact position detector 2 when the contact position detector 2 is provided at a lower-end portion of the window portion W. In the example shown in FIG. 14, when the user touches an eleventh contact position F11 within a region S4 in which the contact position detector 2 is provided and performs the slide operation to a twelfth contact position F12 as in the example shown in FIG. 13, the dimming control part 5 calculates a length of a straight line L4 connected from the eleventh contact position F11 to the twelfth contact position F12 and applies the voltage to the electrodes 3B1 and 3B2 of a corresponding region so that the voltage is applied to a region located on a straight line L5 having the length according to the straight line L4 in the negative direction of the Z-direction from an upper-end portion 3D of the transmittance changing part 3. Here, the dimming control part 5 calculates the length of the straight line L5 with a tendency to lengthen the straight line L5 when the straight line L4 is lengthened. For example, as shown in FIG. 14, an end portion 3E which is opposite to the upper-end portion 3D of the transmittance changing part 3 and which is the end portion in the detection surface of the contact position detector 2 is an example of a third end portion.

On the other hand, FIG. 15 is a diagram showing a state in which an antiglare region SA5 is set according to the slide operation of the user on the contact position detector 2 when the contact position detector 2 is provided in a lower-end portion of the window portion W. In the example shown in FIG. 15, when the user touches a thirteenth contact position F13 within a region S5 provided in the contact position detector 2 and performs the slide operation to a fourteenth contact position F14 as in the example shown in FIG. 13, the dimming control part 5 calculates a length of a straight line L6 connected from the thirteenth contact position F13 to the fourteenth contact position F14 and applies the voltage to the electrodes 3B1 and 3B2 of a corresponding region so that the voltage is applied to a region located on a straight line L7 having the length according to the straight line L6 in the negative direction of the Z-direction from an upper-end portion 3D of the transmittance changing part 3. Here, the dimming control part 5 calculates the length of the straight line L7 with a tendency to lengthen the straight line L7 when the straight line L6 is lengthened.

As described above, the dimming control device 1 according to the second embodiment changes the light transmittance according to a position of the contact operation in the detection surface of the contact position detector 2 provided only in the region of a predetermined range along an end portion of a surface in the transmittance changing part 3. Thus, it is possible to further suppress a change in the light transmittance due to an erroneous operation in addition to obtaining similar effects to the first embodiment.

In particular, when the region of the predetermined range in the detection surface of the contact position detector 2 is set at a lower-end portion of the window portion W in the dimming control device 1, the detection surface of the contact position detector 2 is accommodated inside a door of the vehicle when the user has opened the window portion W, and therefore the user cannot change the light transmittance because the user is in a state in which he/she is unable to be in contact with the detection surface. As a result, the dimming control device 1 according to the second embodiment can more reliably prevent the light transmittance from being changed due to the erroneous operation in a situation in which an antiglare region is unnecessary such as when the window portion W is open.

Third Embodiment

Hereinafter, the third embodiment of the present invention will be described with reference to the drawings. A dimming control device 1 according to the third embodiment forms a lattice-like region in which electrodes 3B1 and 3B2 of a transmittance changing part 3 can individually change the transmittance and has a structure in which both sides of the electrodes 3B1 and 3B2 are mutually separated for each region or a structure in which the electrodes 3B1 or 3B2 are mutually separated for each region. A dimming control part 5 adjusts a size of the antiglare region according to a contact operation of pinch-in or pinch-out on a contact position detector 2 by the user. In other configurations, for example, the same functional units are assigned the same reference signs and a description thereof will be omitted.

Figure 16:
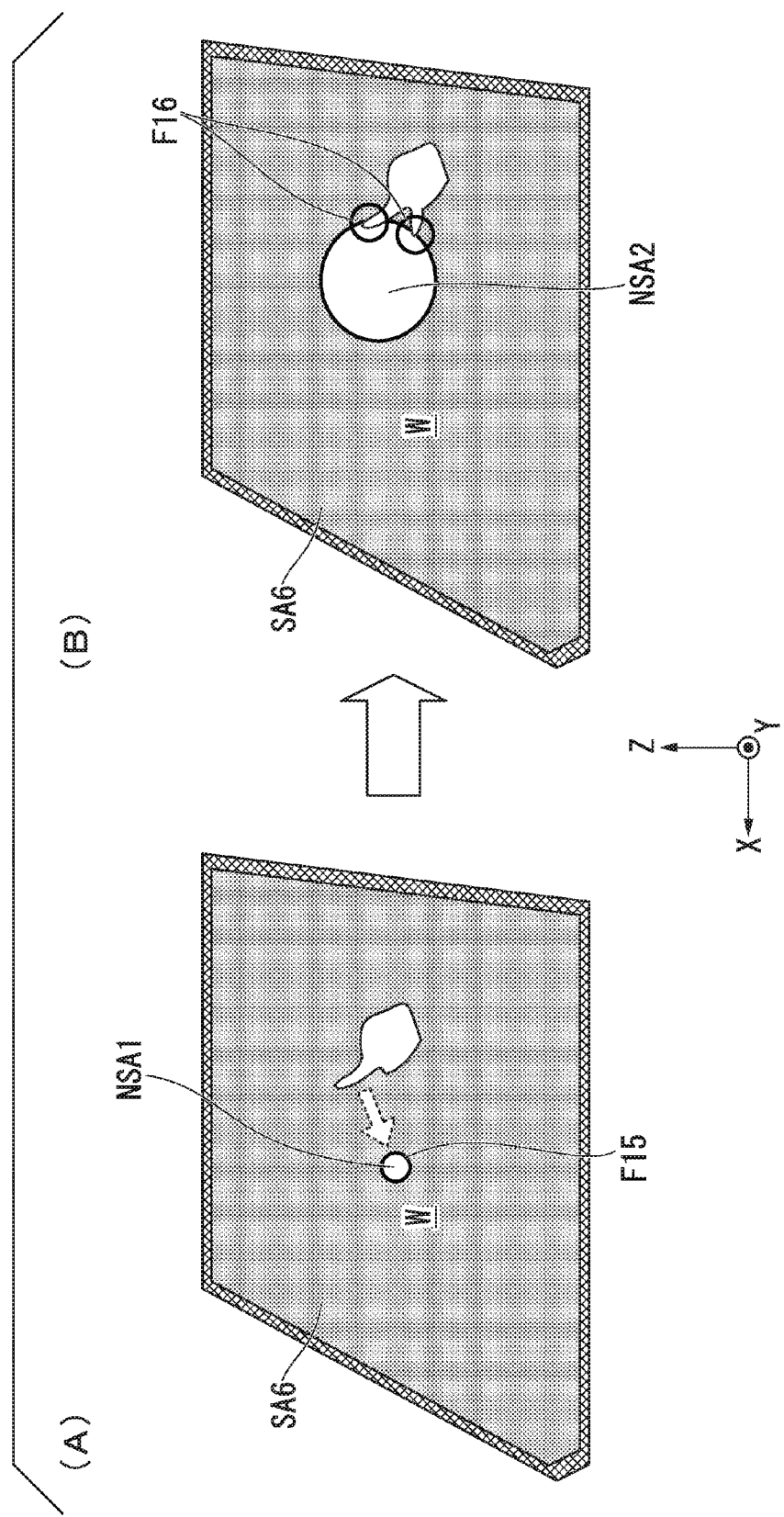
FIG. 16 is a diagram showing a state in which the transmittance of a partial region of the window portion is changed according to a pinch-out operation of the user from a state in which the entire window portion is set as the antiglare region.

FIG. 16 is a diagram showing a state in which the transmittance of a partial region of the window portion W is changed according to a pinch-out operation of the user from a state in which the entire window portion W is set as an antiglare region SA6. When the user touches a fifteenth position F15 in the contact position detector 2 in a state in which the entire window portion W is set as the antiglare region SA6, the dimming control part 5 releases the voltage to the electrodes 3B1 and 3B2 of a corresponding region so that the application of the voltage of a region NSA1 located within a predetermined range including a touched position is released as shown in FIG. 16(A). The predetermined range is, for example, a circular range having a radius of 3 cm around coordinates indicating a touch position of the user.

When the user performs a pinch-out operation to a sixteenth contact position F16 in the contact position detector 2 as shown in FIG. 16(B), the dimming control part 5 causes the region NSA1 to be enlarged as in a region NSA2 shown in FIG. 16(B) according to a change amount of a distance between two points of the sixteenth contact position F16 calculated according to the pinch-out operation. Also, when the user performs the pinch-in operation from a state in which a region in which the voltage is released is set, the dimming control part 5 reduces the region in which the voltage is released. Also, the dimming control part 5 may perform a control of the region in which the voltage is released to be enlarged when the pinch-in operation is performed and may perform a control of the region in which the voltage is released to be reduced when the pinch-out operation is performed.

Also, in a state in which no antiglare region appears in the entire window portion W, the dimming control part 5 may perform an operation described in the third embodiment so that a part of the above-described region is set to the antiglare region in which light transmittance is low according to any operation by the user. Any operation by the user is, for example, an operation of touching the control start region one or more times or the like.

As described above, the dimming control device 1 according to the third embodiment increases the light transmittance of the contact position touched by the user in a state in which the entire window portion W is set as the antiglare region and changes a size of a region in which the light transmittance is increased according to a pinch-in operation or a pinch-out operation. Thus, it is possible to provide an intuitive operation to the user in relation to adjustment of the antiglare region.

While embodiments of the present invention have been described above with reference to the drawings, specific configurations are not limited to the embodiments. Accordingly, modifications, substitutions, omissions, and so on may be made without departing from the scope of the invention.

REFERENCE SIGNS LIST

1 Dimming control device
2 Contact position detector

3 Transmittance changing part
4 Position acquiring part
5 Dimming control part

The invention claimed is:

1. A dimming control device comprising:
a transmittance changing part provided on a windshield of a vehicle and configured to change light transmittance of the windshield;
a detector configured to detect a position of a contact operation on the windshield by a user; and
a dimming control part configured to change the transmittance according to the position of the contact operation on a detection surface of the detector on condition that the detector has detected a contact operation at a control start region which is preset within the detection surface;
wherein the detector includes a first end portion of the transmittance changing part in a part of the detection surface;
wherein the control start region is set at the first end portion of the transmittance changing part; and
wherein, when the user performs a slide operation from a first contact position, which is within the control start region, to a second contact position as the contact operation after the detector has detected the contact operation on the control start region, the dimming control part sets a region determined on the basis of the first end portion and the second contact position as a target region in which the transmittance is changed by the user.

2. The dimming control device according to claim 1,
wherein the control start region is reset at a second end portion opposite to the first end portion as an end portion of the target region in the detection surface of the detector; and
wherein, when the user performs a slide operation from a third contact position, which is within the control start region, to a fourth contact position as the contact operation after the detector has detected the contact operation on the control start region, the dimming control part sets a region determined on the basis of the first end portion and the fourth contact position as the target region.

3. The dimming control device according to claim 1,
wherein the dimming control part changes the transmittance of the target region according to the slide operation by the user in a direction orthogonal to a direction from a second end portion, which is opposite to the first end portion, to the first end portion.

4. The dimming control device according to claim 3,
wherein the dimming control part changes the transmittance of the target region when the user performs the slide operation in the orthogonal direction within the target region.

5. The dimming control device according to claim 3,
wherein the detector sets the control start region at a third end portion which is opposite to the first end portion and which is an end portion in the detection surface; and
wherein the dimming control unit changes the transmittance of the target region according to the slide operation by the user within the control start region in a direction orthogonal to a direction from the third end portion to the first end portion.

6. The dimming control device according to claim 1,
wherein the windshield is at least one of a front windshield, a rear windshield, and a side windshield; and
wherein the control start region is set at an upper end of the detector.

7. The dimming control device according to claim 2,
wherein the dimming control part changes the transmittance of the target region according to the slide operation by the user in a direction orthogonal to a direction from a second end portion, which is opposite to the first end portion, to the first end portion.

8. The dimming control device according to claim 2,
wherein the windshield is at least one of a front windshield, a rear windshield, and a side windshield; and
wherein the control start region is set at an upper end of the detector.

9. The dimming control device according to claim 3,
wherein the windshield is at least one of a front windshield, a rear windshield, and a side windshield; and
wherein the control start region is set at an upper end of the detector.

10. The dimming control device according to claim 4,
wherein the windshield is at least one of a front windshield, a rear windshield, and a side windshield; and
wherein the control start region is set at an upper end of the detector.

11. The dimming control device according to claim 5,
wherein the windshield is at least one of a front windshield, a rear windshield, and a side windshield; and
wherein the control start region is set at an upper end of the detector.

* * * * *